US007019777B2

United States Patent
Sun

(10) Patent No.: US 7,019,777 B2
(45) Date of Patent: Mar. 28, 2006

(54) MULTISPECTRAL IMAGING SYSTEM WITH SPATIAL RESOLUTION ENHANCEMENT

(75) Inventor: Xiuhong Sun, North Andover, MA (US)

(73) Assignee: Flight Landata, Inc., North Andover, MA (US)

(*) Notice: Subject to any disclaimer, the term of this patent is extended or adjusted under 35 U.S.C. 154(b) by 897 days.

(21) Appl. No.: 09/838,712

(22) Filed: Apr. 19, 2001

(65) Prior Publication Data

US 2002/0012071 A1 Jan. 31, 2002

Related U.S. Application Data

(60) Provisional application No. 60/198,986, filed on Apr. 21, 2000.

(51) Int. Cl.
| | |
|---|---|
| *H04N 5/225* | (2006.01) |
| *H04N 9/09* | (2006.01) |
| *H04N 9/097* | (2006.01) |
| *H04N 9/093* | (2006.01) |
| *H04N 5/247* | (2006.01) |

(52) U.S. Cl. .................. 348/263; 348/262; 348/264; 348/265

(58) Field of Classification Search ............. 348/262, 348/263, 265, 264
See application file for complete search history.

(56) References Cited

U.S. PATENT DOCUMENTS

| | | | | |
|---|---|---|---|---|
| 5,099,317 | A | * 3/1992 | Takemura ............. | 348/264 |
| 5,289,269 | A | * 2/1994 | Sugimori et al. ..... | 348/264 |
| 5,414,465 | A | * 5/1995 | Kodama et al. ...... | 348/236 |
| 5,541,653 | A | * 7/1996 | Peters et al. ......... | 348/264 |
| 5,602,588 | A | * 2/1997 | Kusaka et al. ....... | 348/264 |
| 5,640,206 | A | * 6/1997 | Kinoshita et al. .... | 348/264 |
| 5,790,188 | A | 8/1998 | Sun .................... | 348/144 |
| 6,204,881 | B1 | * 3/2001 | Ikeda et al. ......... | 348/362 |
| 6,211,906 | B1 | 4/2001 | Sun .................... | 348/144 |
| 6,526,430 | B1 | * 2/2003 | Hung et al. .......... | 708/523 |

OTHER PUBLICATIONS

"A Hyperspectral/Multispectral Imaging System and its Image Georeference" by Xiuhong Sun and James J. Baker; http://www.flidata.com/newpage3.htm.*
"A Dual–Use Airborne Hyperspectral/Multispectral Imaging System for Remote Sensing" by Xiuhong Sun, Patrick L. Coronado, and Fran Stetina; Presented Oct. 1998; http://www.flidata.com/newpage11.htm.*

(Continued)

*Primary Examiner*—David L. Ometz
(74) *Attorney, Agent, or Firm*—Pearson & Pearson, LLP

(57) ABSTRACT

A spatial resolution enhancement and dynamic range extension for a Computerized Airborne Multicamera Imaging System (CAMIS). CAMIS is a multispectral imaging system for diverse manned and unmanned aerial vehicles to fly along flexible paths and altitudes for a wide variety of applications. CAMIS comprises four spectral bands of progressive scan CCD video cameras with 782×576 square pixels each, giving a total of 1.82 million effective pixels. These cameras are synchronized and aligned in parallel with sub-pixel-accurate spatial offsets over a common field of view. A software procedure interpolates the original four-band 782×576 captures into 1564×1152 ones using a bi-linear algorithm, and then performs geometric correction and band-to-band pixel registration. The result is a more precisely registered, spatial resolution enhanced multispectral image, sized 1540(H) ×1140(V)×4(Bytes). The CAMIS CCD cameras include a controllable electronic shutter, which permits the system to acquire a desirable range of signals by a computed exposure, and then bracket it with two additional up/down-stepped exposures into computer memory. The integrated data set of the multiple stepped exposures results in effectively extending the dynamic range of the measurement.

6 Claims, 9 Drawing Sheets

OTHER PUBLICATIONS

"Computerized Airborne Multicamera Imaging System", authors Xiuhong Sun, James Baker and Richard Hordon, Presented 2nd International Airborne Remote Sensing Conf. and Exhibition, San Francisco, CA, Jun. 24–27, 1996, pp. III–803 to III–812.

"Computerized Airborne Multicamera Imaging System (CAMIS) and its Four–Camera Applications*", authors Xiuhong Sun, James Baker and Richard Hordon, Presented at 3rd International Airborne Remote Sensing Conference and Exhibition, Jul. 7–10, 1997, Copenhagen, Denmark, pp. II–799 to II–806.

* cited by examiner

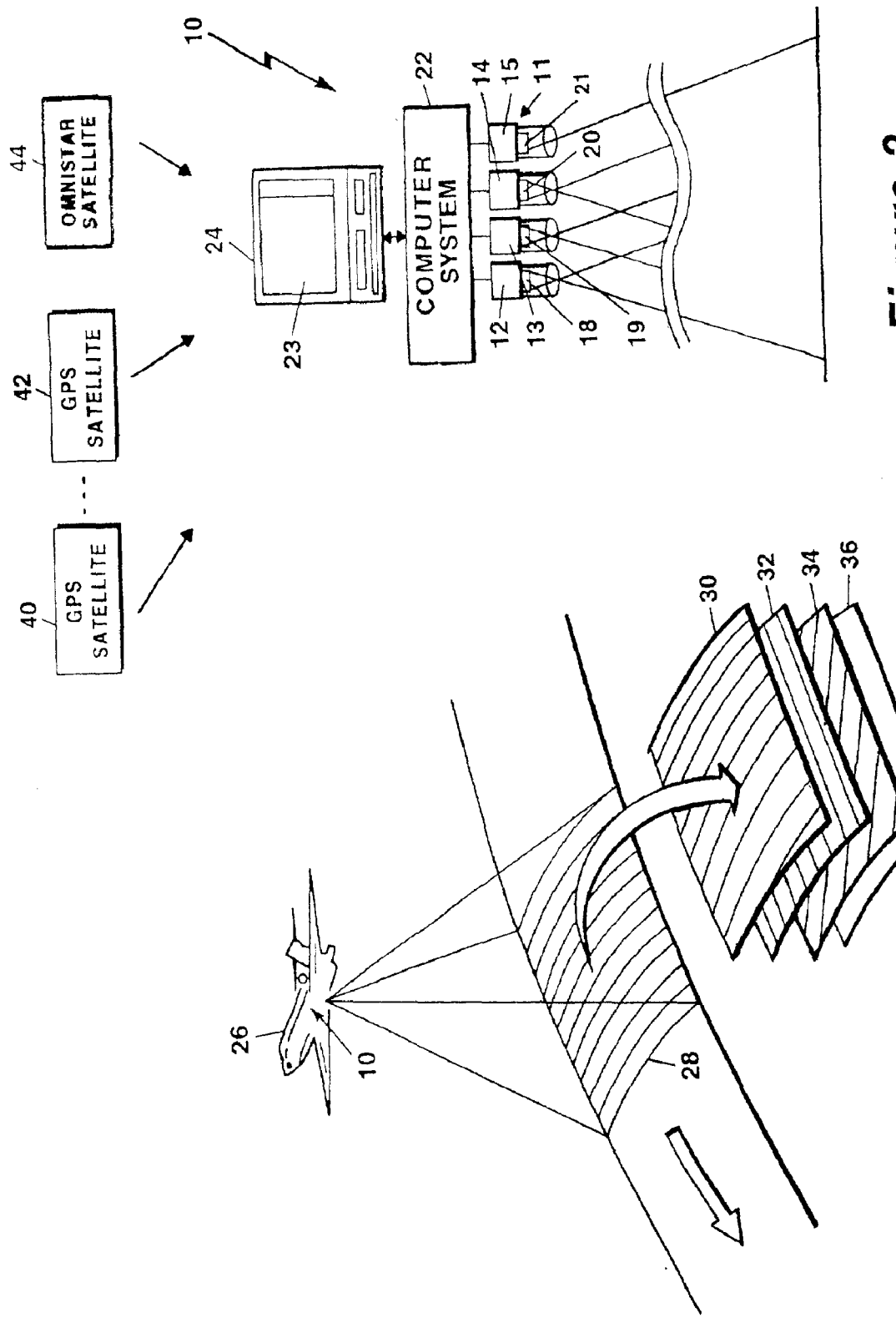

MULTISPECTRAL IMAGING SYSTEM WITH SPATIAL RESOLUTION ENHANCEMENT

This is a nonprovisional patent application claiming priority of provisional application for patent Ser. No. 60/198,986, filed Apr. 21, 2000.

BACKGROUND OF THE INVENTION

1. Field of the Invention

This invention relates to an airborne multispectral imaging system and in particular to a computerized airborne multicamera imaging system with spatial resolution enhancement and extended dynamic range.

2. Description of the Related Art

There are increasing concerns about the environmental change of our earth and the effective management of human activities altering and using our planet. Modern terrestrial remote sensing, featuring digital spectral image data collection technologies, has been increasingly used for quickly and efficiently mapping, imaging and monitoring our planet earth from global scale to regional. The first commercial 1-meter resolution satellite, U.S. Space Imaging's Ikonos, was successfully launched in August 1999, joining the Landset, Spot, and other operational Earth observation satellites and providing 1-meter-resolution photographs of almost any place on earth. Aerial remote sensing platforms are indispensable and valuable adjuncts to the latest Earth observation satellites. New generations of smaller, lighter, power saving, cheaper and better hyperspectral/multispectral imaging systems are becoming operational to fly with diverse low-cost flying platforms in traditional light aircraft, balloons and airships to the latest unmanned aerial vehicles (UAVs). Quickly available higher spatial and spectral resolution airborne spectral images with extended dynamic range are broadly desired for regional, special and satellite-demanded ground truth remote sensing applications.

Modern hyperspectral, multispectral, and hyperspectral/multispectral multi-use airborne imaging systems for manned and unmanned aerial vehicles are capable of acquiring hyperspectral pushbroom scanning images, multiangle-multispectral pushbroom scanning images, and/or multispectral photographic framing images to satisfy a wide variety of remote sensing applications. Almost all these systems feature some sort of computerization, which not only permits bursting the acquired spectral images into computer memory for real-time analysis and saving them directly into the computer hard disk but also enables intelligent system control and automation.

Spatial resolution is one of the most demanding factors for remote sensing applications. Spatial resolution describes the fineness of detail that can be distinguished in an image. Higher resolution allows us to distinguish smaller objects. As the resolution linearly increases, amount of (or the market) for remote sensing applications could exponentially increase. For example, one-meter resolution satellite and airborne images can easily recognize cars and school buses, and can be used for road and pavement management, disaster relief control and many other city or regional plans. Sub-foot to inch-resolution airborne multispectral images, demonstrated in the system described herein, are desirable for many advanced innovative applications. From moose and wetland bird counting for wildlife management to under-canopy forestland monitoring, from village and golf course precision survey to town and country precision mapping, the applications are endless.

Dynamic range is another demanding aspect for remote sensing applications. The dynamic range is defined as the ratio of maximum measurable signal to minimum detectable signal. In remote sensing, it is the ability to discover dim features in the presence of strong, bright objects. Remote sensing produces wide area coverage and vast quantities of collected data. Very often the areas of interest include diverse dim and bright objects. Examples include searching for a downed light aircraft hidden in the forest or shallow water, monitoring the results of human controlled bush burning under a forest canopy, and evidence of illegal logging, where the faint and dim objects situated in the dark shadow areas of forest canopy are required to be detectable in the presence of very bright, very well illuminated canopies.

Resolution and dynamic range are so important that their enhancement and extension are generally considered as a key part of instrument system design.

In U.S. Pat. No. 5,790,188 issued to Xiuhong Sun on Aug. 4, 1998 and assigned to Flight Landata, Inc. of Lawrence, Mass., a variable interference filter imaging spectrometer (VIFIS) system is described which acquires ground track spectral images from air or space with a two-dimensional field of view and generates spectral imagery from three channels of synchronized video outputs. The synchronized video stream outputing from each camera is fed to a control and interface unit where a composite analog signal is formed from the individual output video signals for recording on an analog video recorder. A digital signal is also generated for recording on a computer disk. Control of the shutter speed of each of 3 cameras is provided.

In U.S. Pat. No. 6,211,906 issued to Xiuhong Sun on Apr. 3, 2001 and assigned to Flight Landata, Inc. of Lawrence, Mass., a computerized component, variable interference imaging spectrometer ($C_2$VIFIS) is described for airborne remote sensing and data acquisition with a two dimensional field of view. Spectrally filtered video data is obtained from three synchronized CCD-imager modules or cameras wherein one imager module has a visible range variable interference filter on its surface, a second imager module has a near-infrared variable interference filter on its surface, and a third imager module has a bandpass filter attached to the imager. An alternating staring/scanning method is used to optimize a pushbroom hyperspectral image data set with a photogrammetric reference.

A computerized airborne multicamera imaging system (CAMIS) is described in a paper by Xiuhong Sun, James Baker and Richard Hordon entitled "Computerized Airborne Multicamera Imaging System" (CAMIS), Second International Airborne Remote Sensing Conference and Exhibition, San Francisco, Calif., 22–27 Jun. 1996. The CAMIS comprises a personal computer such as a Pentium 133 MHz computer which receives data from three synchronized CCD cameras with interchangeable narrow-band interference filters and a variable interference filter. Simultaneous, digital multichannel images are directly recorded onto SCSI drives without compression.

An improved computerized airborne multicamera imaging system (CAMIS) with four camera integration for remote sensing is described in a paper by Xiuhong Sun, James Baker and Richard Hordon entitled "Computerized Airborne Multicamera Imaging System (CAMIS) and Its Four-Camera Application", Third International Airborne Remote Sensing Conference and Exhibition, 7–10 Jul. 1997, Copenhagen, Denmark. This improved CAMIS is a direct-sensor-to-computer imaging system which has integrated real-time positioning, a live moving map, and a live composite image display window for four cameras into a compact personal computer running under Windows NT. This paper also shows that a sequence of four channel CAMIS snapshots can be composed and mosaiked as a natural/NIR color composite pair with larger coverage, in which spectral characteristics beyond human eyes become easily recognized because of the large scale aerial multispectral viewing.

The present invention is a further improvement of the CAMIS having not only four synchronized progressive scan CCD video cameras with interchangeable narrow band interference filters but also spatial resolution enhancement and extended dynamic range.

SUMMARY OF THE INVENTION

Accordingly, it is therefore an object of this invention to provide a computerized airborne multicamera imaging system (CAMIS) with spatial resolution enhancement and extended dynamic range.

It is another object of this invention to provide a multispectral imaging system that generates four spectral bands from four cameras that are synchronized and aligned in parallel with sub-pixel-accurate spatial offsets over a common field of view.

It is a further object of this invention to provide a CAMIS with spatial resolution enhancement by using a method of half-pixel alignment of four bands of images for increasing sensing dots by a factor of four and a resampling-up operation for redistributing the sensing dots to restore the original scene and resolution.

It is yet another object of this invention to provide a CAMIS with dynamic range extension by bracketing on images with multiple exposures or snapshots.

These and other objects are accomplished by an imaging system having spatial resolution enhancement comprising means for providing multispectral bands of images, a computer connected to the means for providing the multispectral bands of images for receiving the multispectral bands of images, means within the computer for resampling-up the multispectral bands of spectral, means for storing the resampled-up multispectral bands of images; and means for performing multispectral band-to-band pixel registration of the resampled-up images. The computer comprises a memory for storing the resampled-up, registered images. The means for producing multispectral bands of images comprises a plurality of cameras. The plurality of cameras comprises an interline transfer, black and white, progressive scan, CCD video cameras. Each of the plurality of cameras comprises 782×576 square pixels. The plurality of cameras are optically aligned with a fractional pixel offset to each other. Each of the plurality of cameras comprises a narrow band interference filter in front of the lens of each of the plurality of cameras. The narrow band interference filter in front of each of the plurality of cameras comprises user selectable spectral bands within a spectral range covering blue, green, red and near infrared. The means for resampling-up the multispectral bands of images comprises a routine for performing a neighbor average interpolation. The computer comprises means for acquiring a bracket of computer controlled multiple exposures of the multispectral bands of images for extending dynamic range.

The objects are further accomplished by a method of providing an imaging system with spatial resolution enhancement comprising the steps of providing a sensor head including a plurality of cameras, each of the cameras having a narrow band interference filter producing multispectral bands of images, digitizing the multispectral bands of images from the plurality of cameras, storing the digitized multispectral bands of images, performing a resampling-up operation on the bands of images, and performing band-to-band pixel registrations of the bands of images. The method comprises the step of storing the resampled-up, registered images in a memory. The method comprises the step of the cameras being optically aligned with a fractional pixel offset to each other. The step of performing the resampling-up operation on the bands of images comprises the step of performing a neighbor average interpolation. The step of providing a sensor head including a plurality of cameras comprises the step of providing progressive scan, interline transfer, CCD video cameras. The step of providing a sensor head including a plurality of cameras each of the cameras having a narrow band interference filter comprises the step of the narrow band interference filter having user selectable spectral bands within a spectral range covering blue, green, red and near infrared. The step of providing a sensor head including a plurality of cameras comprises the step of providing each of the plurality of cameras with 782×576 square pixels. The step of performing band-to-band pixel registration of the multiband images comprises the step of cropping edges of the multiband composite to produce a 1532×1150×4 bands formatted image. The step of performing the resampling-up operation comprises the steps of redistributing the sensed data of each of the bands of images by filling odd columns with existing data and even rows/columns with zeros, calculating an average value of the pixel data at every two adjacent odd columns, copying the average value into an even column between the adjacent odd columns, redistributing the sensed data of each of the bands of images by filling odd rows with existing pixel data and even rows with zeros, calculating an average value of the pixel data at every two adjacent rows, and copying the average value into an even row between the adjacent odd rows. The method comprises the step of acquiring a bracket of computer controlled, multiple exposures of the multispectral bands of images for extending dynamic range.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 1 is a pictorial representation of a two-dimensional field of view from an aircraft carrying a computerized airborne multicamera imaging system (CAMIS) showing four spectral bands of image planes obtained by four progressive scan synchronized CCD cameras;

FIG. 2 is a block diagram of the CAMIS employed in the aircraft in FIG. 1;

FIG. 6(a) shows a simulation of taking the image of "a" using an IT CCD imager where an array of squares are the photo-sensing elements;

FIG. 6(b) shows an actual image of the letter "a" on 5×5 photosites of the IT CCD imager which is digitized and sent to a computer system;

FIG. 6(c) shows the image format commonly displayed by the computer system for the 5×5 photosites image of "a";

FIG. 6(d) shows a resampling-up operation to redistribute the sensing data in order to restore the original scene and resolution by doubling the pixel numbers in both row and columns dimensions;

DESCRIPTION OF ILLUSTRATIVE EMBODIMENTS

CAMIS System

Figure 3:
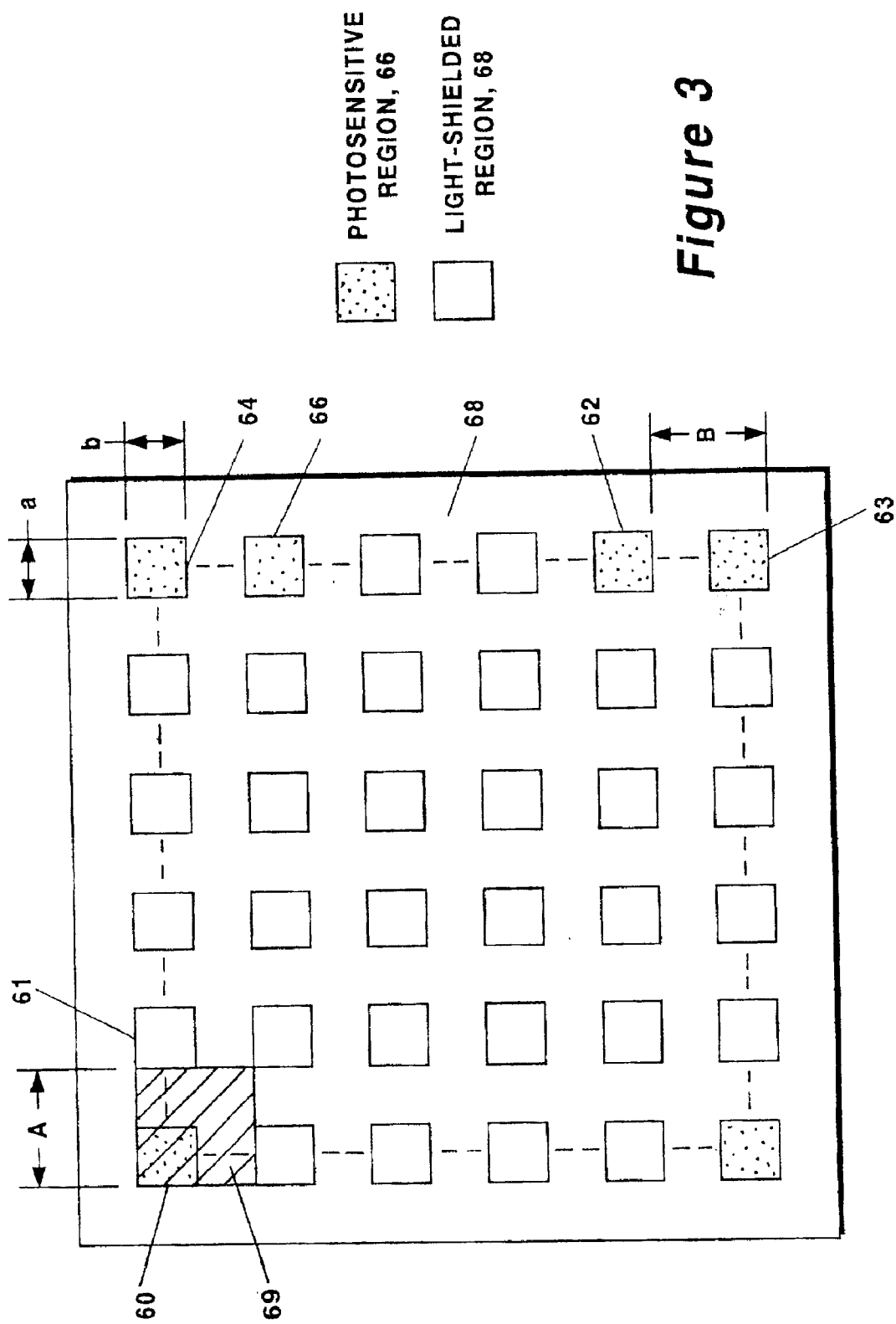
FIG. 3 is a schematic of the pixel factors of a CCD imager.

Referring to FIG. 1, a pictorial representation of an aircraft 26 employing the invention is shown. The invention of a computerized airborne multicamera imaging system (CAMIS) 10 is shown having spatial resolution enhancement and dynamic range extension integrated for photographic framing-type spectral imaging. The CAMIS 10 acquires earth surface images 28 from air or space with a two-dimensional field of view and generates imagery from four channels of synchronized video sources. The earth surface images 28 are transformed into four user selective spectral bands 30, 32, 34, 36 within the 400–1000 nm spectral range.

Referring to FIG. 2, a block diagram of the CAMIS 10 is shown comprising a sensor head 11, an integrated computer system 22 including a differential (GPS) (not shown). The sensor head 11 comprises four synchronized Sony XC-8500CE ½" black-and-white progressive scan CCD video cameras 12, 13, 14, 15 with 782×576 effective square pixels each. By attaching interchangeable narrow band interference filters 18, 19, 20, 21 to the front of the lens of each of the cameras 12, 13, 14, 15, four user-selectable spectral bands within the 400–1000 nm spectral range, such as blue, green, red, and near infrared (NIR) at 450, 550, 650, and 800 nm respectively with bandwidth 10nm or 25nm each, can be captured with non-compromised color separation. The Sony XC-8500CE camera was designed for optimum performance in a motion environment. Using interline transfer progressive scan technology with a controllable electronic shutter, all pixels of a XC-8500CE camera are exposed to light exactly the same amount of time and transferred to the vertical shift registers quickly and simultaneously for minimized smear. The camera provides accurate and clear images for capturing objects moving at high speeds.

The computer system 22 comprises mission planning, system automation, interactive operation, and image post-processing software to produce high quality, spatial resolution enhanced, instantaneous-freeze-frame multispectral images.

A GPS (Global Positioning System) receiver, such as the Motorola Oncore VP, is used for real-time measurement of geodetic position of the CAMIS 10 platform. The Oncore VP receives signals from 8 GPS satellites (40, 42). However, the GPS accuracy could be intentionally degraded by what U.S. Department of Defense with semi-random errors up to 100 meters along with other systematic errors. One method for correcting the errors is to use "monitors" at known locations (Base Stations) to measure the errors, generate corrections, and send them to other remote GPS receivers, which is called a differential GPS (DGPS) correction. The Oncore VP is a differential correction capable receiver which accepts the correction signals.

An OmniSTAR satellite 44 is a satellite fed DGPS service, with many widely-spaced Base Stations for wide area coverage. OmniSTAR 44 (along with its receiver) can improve the accuracy of a GPS receiver by as much as 100 times. It is a real-time system that can achieve sub-meter accuracy over most land areas worldwide. The Oncore VP is compatible with the Omnistar receiver.

The CAMIS 10 is designed as an easy to deploy and operate multispectral imaging system suitable for use with a wide range of manned and unmanned light aerial vehicles to fly flexible paths with flexible configurable resolutions under diverse weather conditions. CAMIS can deliver precision geo-referenced framing-type four-band multispectral imagery from low-altitude, e.g. 600 feet, with a few inch resolution, to mid-altitude, e.g. 10,000 feet, for large local area coverage. All the spatial and spectral information of the CAMIS multispectral imagery are acquired simultaneously and instantly and can be delivered to the end user in a short turn around time with little processing required.

Benefitted by computerization and miniaturization, the CAMIS 10 is highly automatic, intelligent, and compatible to many light UAVs for total hands-off airborne data acquisition. When programmed, the computer system 22 can load the predefined flight plan and watch for regions of interest using an integrated GPS receiver. After the power is switched on, it can automatically start data acquisition when flying over the predefined flight tracks. It also automatically adjusts the exposure of the cameras 12–15 to fit the perceived imaging signals of the scene according to a built-in real-time histogram feature, and records the exposure settings, which are important for radiometric calibration. For automatic operation, it is not necessary to connect a monitor, a keyboard and/or a mouse.

For manned flights, the real-time camera images are also displayed on a monitor 24 in the cockpit along with a moving map 23. This gives the pilot and the observer a real-time indication of what path the aircraft is flying and what the cameras 12–15 are seeing. This is essential for quick response missions for disaster situations or other urgent needs. CAMIS 10 records the flight path flown and the area imaged by using GPS and moving map capability, to provide mission documentation and confirmation of mission objective.

Basic software features integrated into the computer system 22 include mission plan, mission automation, computerized exposure control, GPS timing signal triggered captures, and multi-window visualizations of the live image, moving map, histogram and GPS status on Microsoft WindowsNT environment for interactive data acquisition. Additional software features for the system include batch processing for GIS-compatible image geo-reference, quick-dirty automatic mosaicking, and timely data delivery with original GPS tags.

Spatial Resolution Enhancement

Referring to FIG. 2, the CAMIS sensor head 11 comprising the four Sony XC-8500CE interline transfer, black-and-white progressive scan, CCD video cameras 12–15 with 782×576 square pixels each, provides a total of 1.82 million effective pixels. By attaching interchangeable narrow band interference filters 18–21 on the front optics of each of the cameras 12–15, four user-selectable spectral bands 30–36, such as NIR, red, green, and blue, can be captured with non-compromised color separation. These four interline transfer (IT) progressive scan, CCD cameras 12–15 are synchronized and aligned in parallel with sub-pixel spatial offset tolerance over a common field of view. Considering that the area of each sensing element of an interline transfer CCD is partially masked with aluminum coating for buried vertical shift registers and the light sensing area fills only 25% of an imaging pixel (shown in FIG. 3), sub-pixel spatial offset permitted in the alignment is useful for providing spatial resolution enhancement. In other words, these slight sub-pixel variations in camera alignment make the 25% fill area (e.g. a×a in FIG. 3) of each camera pixel see a slightly different detail within a ground pixel (e.g. A×A in FIG. 3) By appropriately aligning the camera mount with all the partly filled 1564×1152 sensing elements of four cameras 12–15 and digitally re-distributing them evenly over a field overview, results in a special sensor head 11 that is equivalent to a large format single chip multispectral CCD with 1564×1152 pixels but non-compromised configurable color separation. Together with progressive scan technology, the CAMIS achieves full-frame electronic shutter operation synchronized for all its four cameras 12–15, resulting in a high spatial resolution of 1564×1152 sensing dots captured simultaneously.

Referring to FIG. 3, a schematic is shown of pixel factors of CCD imagers 12–15. For digital images, all the pixels must appear to be square and to cover the continuous image as pixel 69. However, the actual pixel sensing may be different. To know the actual imaging upon a pixel 69, a set of geometry parameters associated with CCD imagers 12–15 are defined as follows:

Parameters A and B are the spacing between two adjacent photo-sensing elements such as elements 60, 61 and 62, 63 respectively and represent the sampling distances. The parameters a and b are the dimensions of a photo-sensing element 60, 61, 62, 63, or 64 and represent the sampling distances. In most popular CCD imagers, including the interline transfer (IT) CCD imager used by CAMIS 10, a portion of the camera surface 68 is not sensitive to light. The fraction of the surface of the photosensitive region 60 to the total pixel 69 size is termed the fill factor and is given by the ratio ab/AB.

The IT CCD imagers 12–15 with square pixel geometry (A=B) typically have a 25% fill-factor. To increase the photosensitive area 66 for each photosensitive element 60, 61, 62, 63, some IT CCD imagers use microlenticular arrays overlapped on each photosensitive element. These little lenses focus the light that would normally strike the non-photosensitive areas into regions that are sensitive. However, because of lack of uniformity of the lenses across the array along with the spatial smoothing effect of the increased fill factor, CAMIS 10 uses a measurement grade CCD imager, the Sony XC-8500CD ½", black-and-white, progressive scan, CCD video cameras with 782×576 square effective pixels each, without using the micro-lenses.

Figure 4:
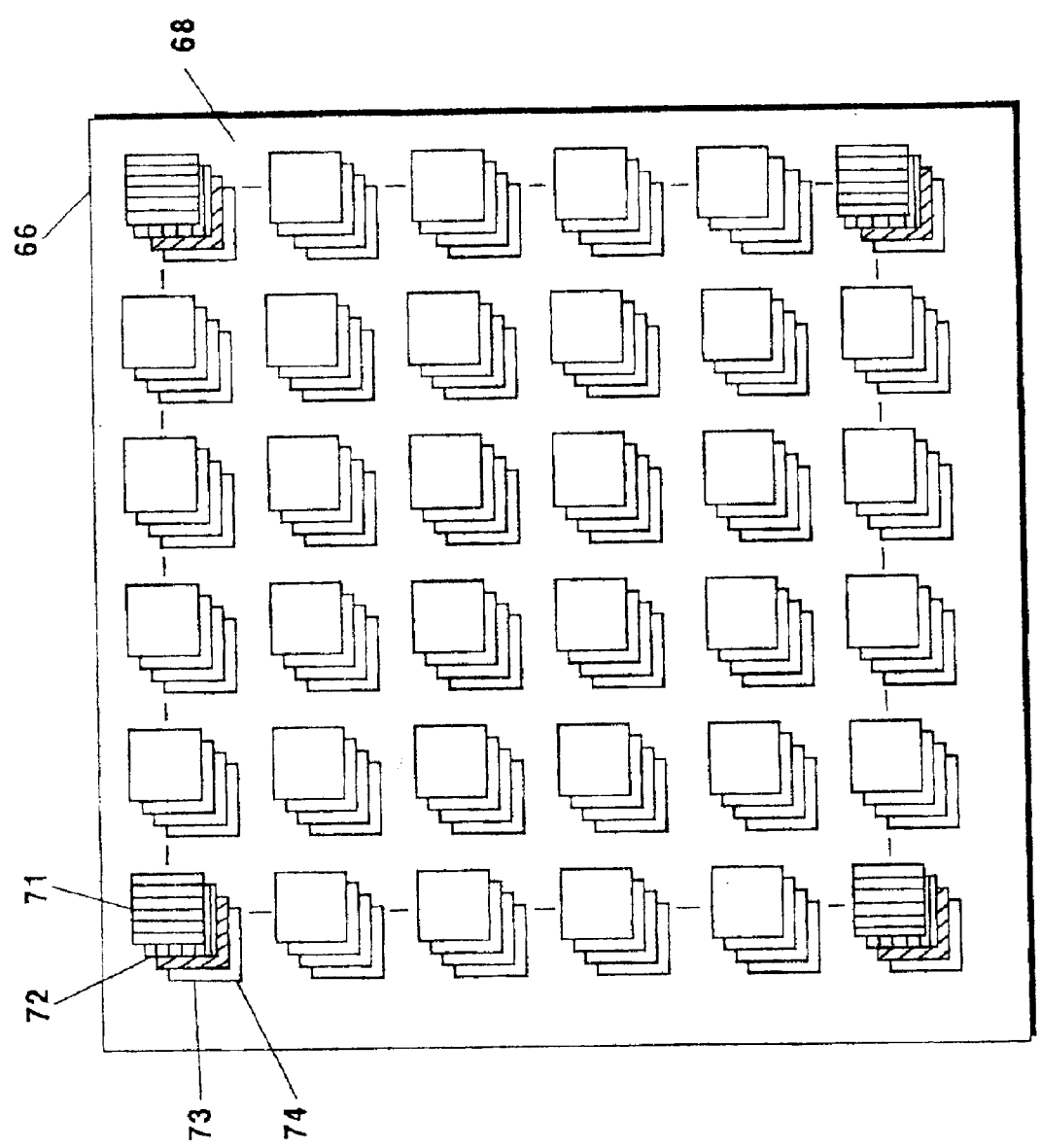
FIG. 4 shows a perspective view of the alignment of four bands of images from four camera directly superimposed one band over one band.

Referring to FIG. 4, a perspective view of a non-offset alignment is shown for four bands of images from the four cameras 12–15. This non-offset CAMIS 10 alignment strategy requires that the four cameras 12–15 are precisely aligned so that all the four bands 71–74 of imaging are superimposed one over one without significant sensing element offset as illustrated in FIG. 4. This alignment method takes the four-band image with the same number of sensing dots as those of one band image. Therefore, the spatial content obtainable by this imaging mode will not increase. Inaddition, in practice this alignment method is difficult to be implemented exactly as it is designed because of the real-world errors, which include the optical and mechanical parts tolerance permitted in the manufacture process, and the imperfections of the alignment. In the worst case, these misalignment errors can be as big as 0.5A/B steps.

Figure 5:
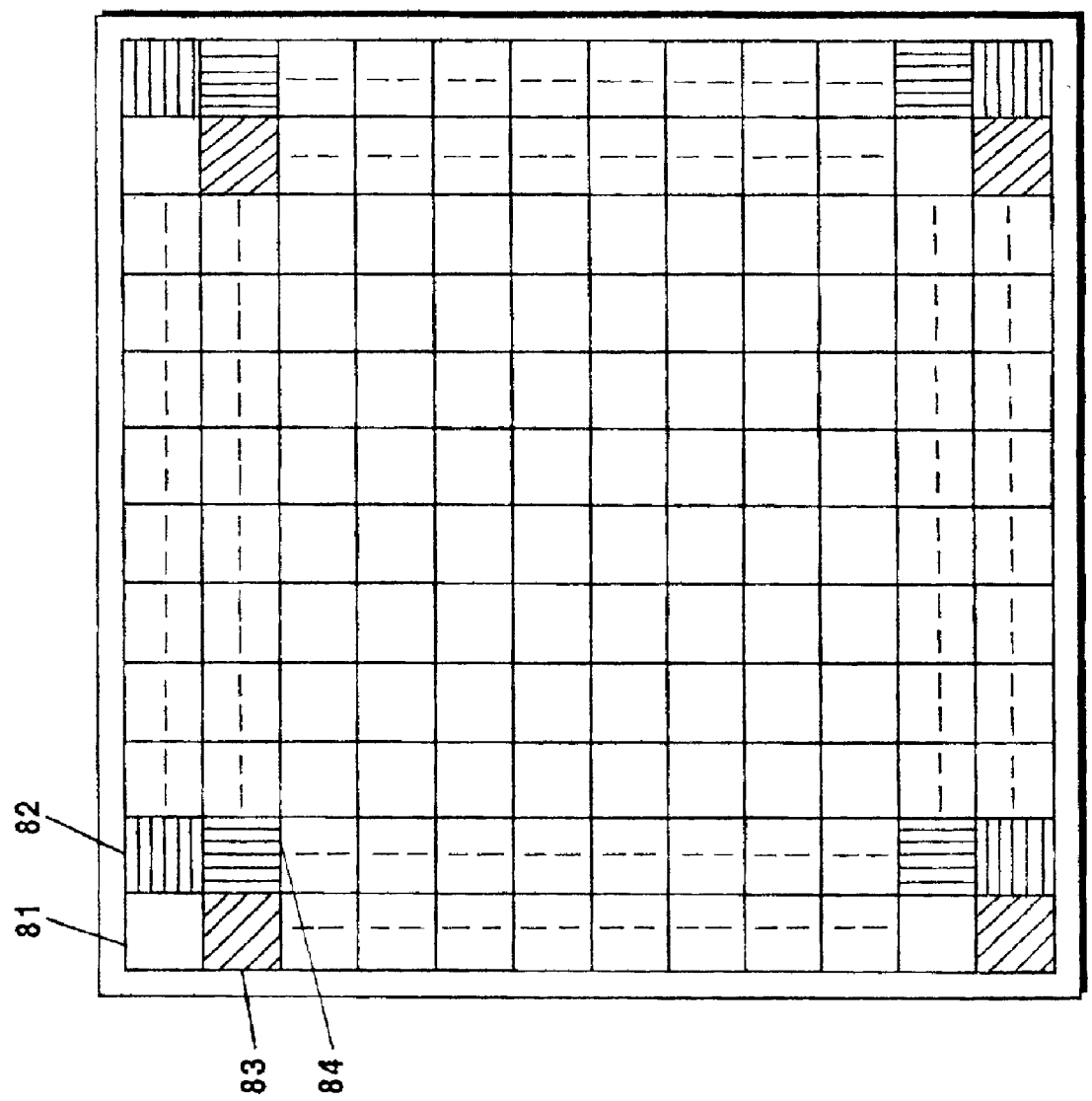
FIG. 5 shows a half-pixel offset alignment of four bands of images from four cameras.

Referring to FIG. 5, a half-pixel offset alignment method is shown for four bands 81–84 of images from the four cameras 12–15. As previously described, the IT CCD imager with square pixel geometry (A=B) typically has a fill-factor of 25%. Hence, the sensing area for a pixel is only a quarter of the pixel area. According to this feature of the IT CCD imagers 12–15, a half-pixel (~0.5A, ~0.5B) offset alignment method for CAMIS 10 has been employed to improve the spatial imaging performance as shown in FIG. 5.

The half-pixel alignment method requires that the four cameras 12–15 are aligned so that all the four bands 81–84 of imaging have a half pixel or so offset to each other. (in practice ~0.5, ~1.5, and ~2.5A (or B) offset is allowed). With the same imaging area of a single CCD imager, this method increases the sensing dots of the four-camera image by a factor of four compared to the single camera image. Therefore, the spatial content of the imaging is quadrupled. In other words, the CAMIS 10 that comprises four spectral bands 81–84 of progressive scan CCD video cameras 12–15 with 782×576 square pixels each gives a total of 1.82 million effective sensing dots using this half-pixel offset camera alignment method.

The CAMIS 10 with four individual 782×576 square pixel CCD imagers 12–15 is equivalent to a 1564×1152 single chip CCD imager using half-pixel offset alignment cocept. Also, the four imagers 12–15 comprise the four interchangeable independent narrow band interference filters 18–21. Therefore, CAMIS 10 provides much better color separation and more flexible band configuration than that of any single chip CCD imager achievable. Furthermore, the present four CCD imagers 12–15 can achieve a much better data bandwidth (60 frames of 1564×1152 images per second) than that of a 1564×1152 single chip CCD (best achievable at this movement is 12 frames of 1564×1152 images per second) for high speed remote sensing using jet aircraft or other high speed low altitude platforms.

Figure 6:
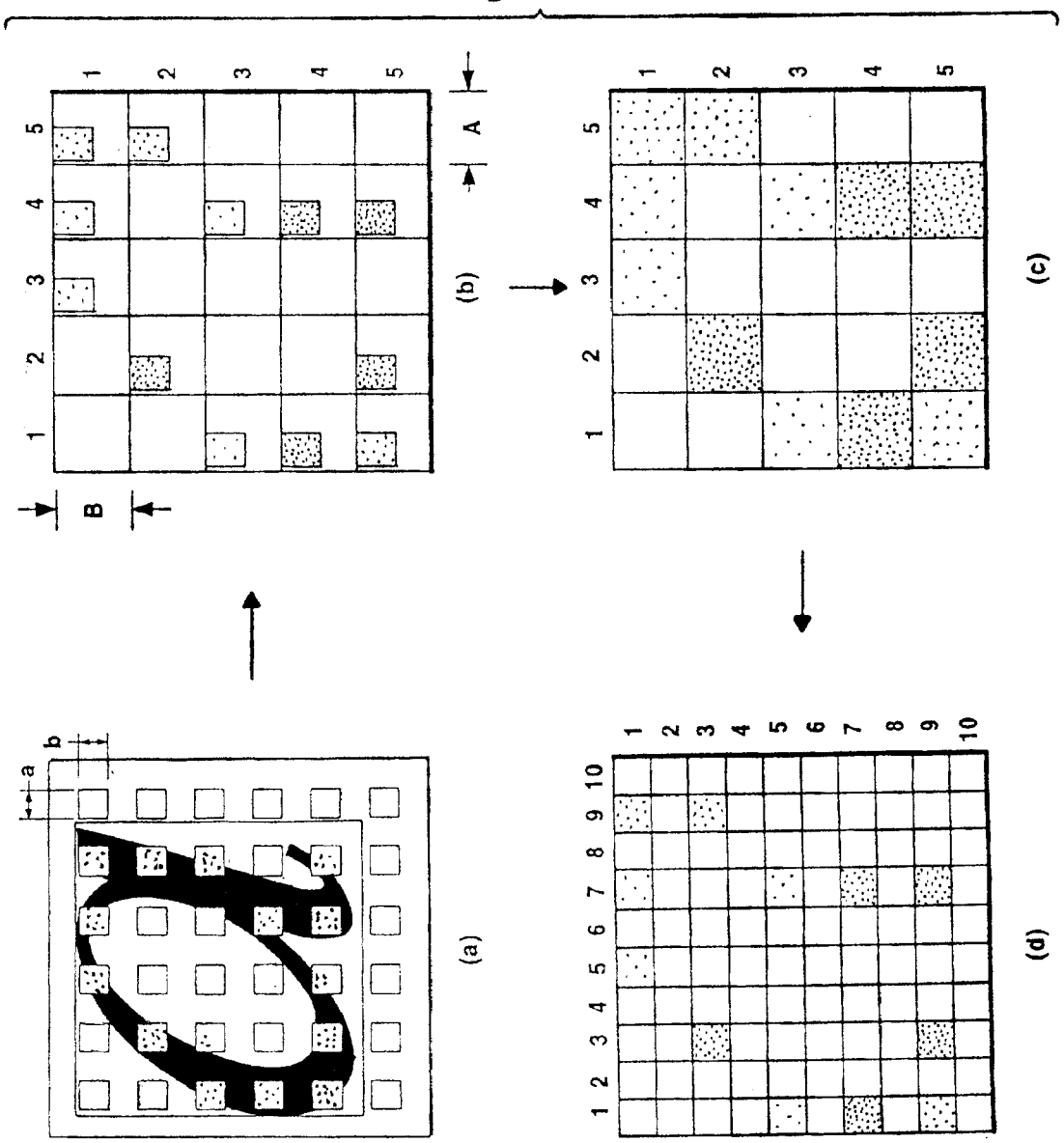
FIG. 6 shows the imaging geometry of an interline transfer CCD imager and the original scene restoration.

Referring to FIG. 6, the imaging geometry of the interline transfer CCD imagers 12–15 is shown and the original scene restoration. FIG. 6(*a*) depicts a computer simulation for imaging a character "a" using an IT CCD imager. FIG. 6(*b*) shows an actual image of the letter "a" on 5×5 photosites of the IT CCD imager which is digitized and sent to a computer system. Optically, the character "a" is imaged as shown with the actual sensing elements (sized at a×b, which determines the actual smallest sensing dimension) smaller than a pixel that is defined as A×B. However, the ordinary computer image format used to display the image does not match the actual imaging. FIG. 6(*c*) shows the image format commonly displayed by a computer on the 5×5 photosites of "a". The computer processes and displays the image using 100% filled pixel assumption which apparently reduces the imaging resolution and fidelity for an IT CCD camera. FIG. 6(*d*) shows a resampling-up operation which is used to redistribute the sensing dots in order to restore the original scene and resolution. This operation doubles the pixel numbers in both row and column dimensions.

Figure 7:
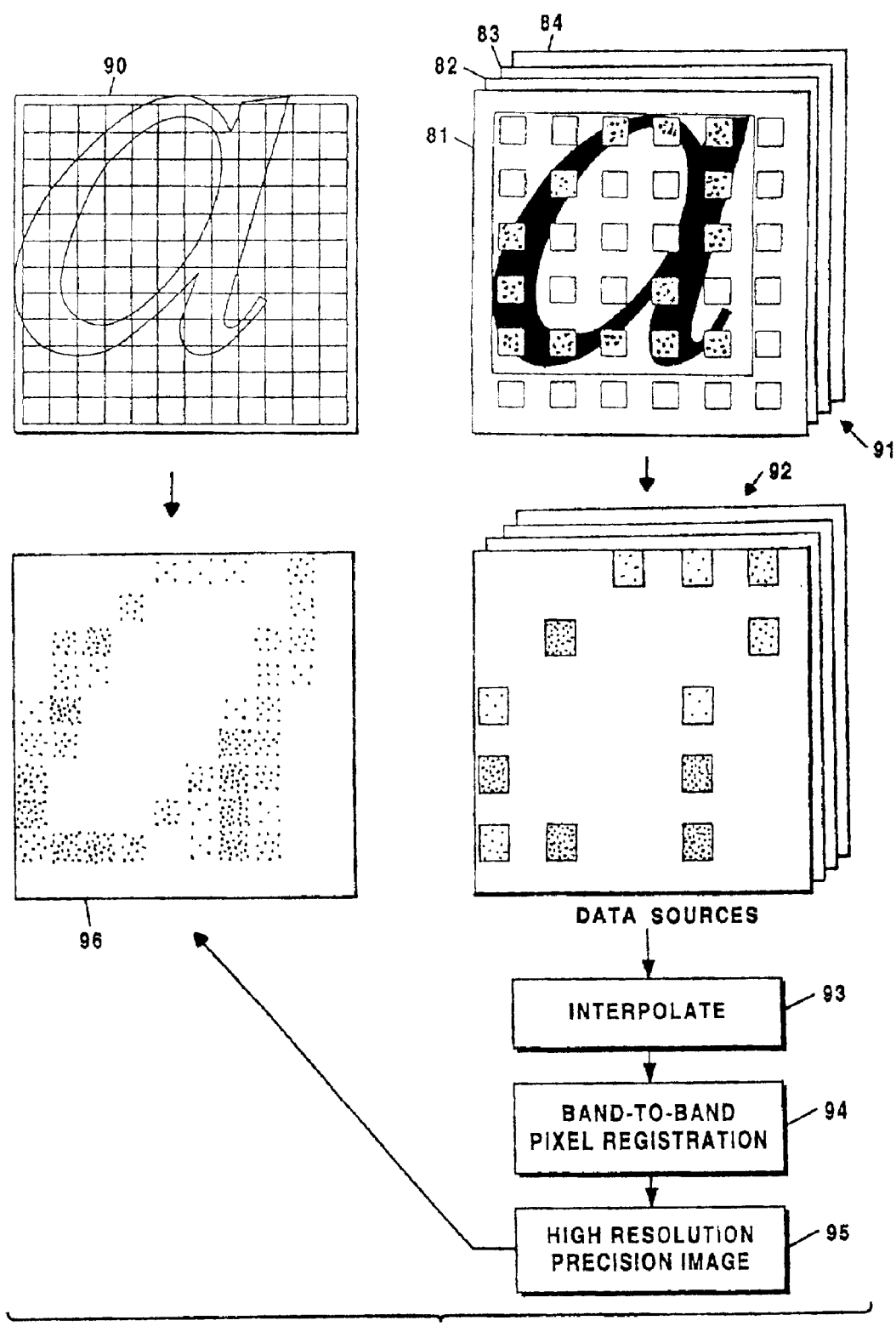
FIG. 7 shows a graphic/flow chart for high-resolution, larger-format imaging using four bands of interline transfer CCD cameras that are optically aligned with half-pixel offset and a flow chart for high-resolution image reduction.

Referring now to FIG. 7, a combined graphic/flow chart is shown for high resolution, larger-format imaging using four bands 81–84 of interline transfer CCD cameras 12–15 that are optically aligned with a half pixel (one sensing element) offset to each other and a flow chart for high-resolution image reduction. Original images are received from the four individual IT CCD cameras 12–15 simultaneously. Four bands 91 of images as shown in FIG. 7 are the data sources 92. The digitized images need to be resampled-up for example, from 782 ×576 to 1564×1152, (See FIGS. 6*c* and 6*d*) to take advantage of the fine, sub-pixels-sized sensing elements or finaer pixel pitel that permits band shifting for better band-to-band registration Interpolate 93 operations are needed to fill the blank rows and columns inserted in each band of image when resampling-up. Otherwise, the image will not be in a human vision acceptable format. A neighbor average interpolation (NAI) algorithm provides an integrated step for two fold resampling-up, which resamples the original four-band 768×576 digital images up to 1536×1152 ones in this case. The NAI algorithm steps are as follows:

First, each band of the 768×576 sensed dots are redistributed to a 1536×576 grid, which consists of odd columns filled with existing data of the sensed dots and even columns inserted as blank space;

Second, the average value of the pixel data at every two adjacent odd columns is calculated and then copied to the even column between them;

Third, each band of the interpolated 1536×576 image is redistributed to a 1536×1152 grid, which consists of odd rows filled with existing pixel data and blank even rows inserted; and Fourth, the average value of the pixels is calculated at every two adjacent odd rows and copies it to the even rows between them.

Figure 8:
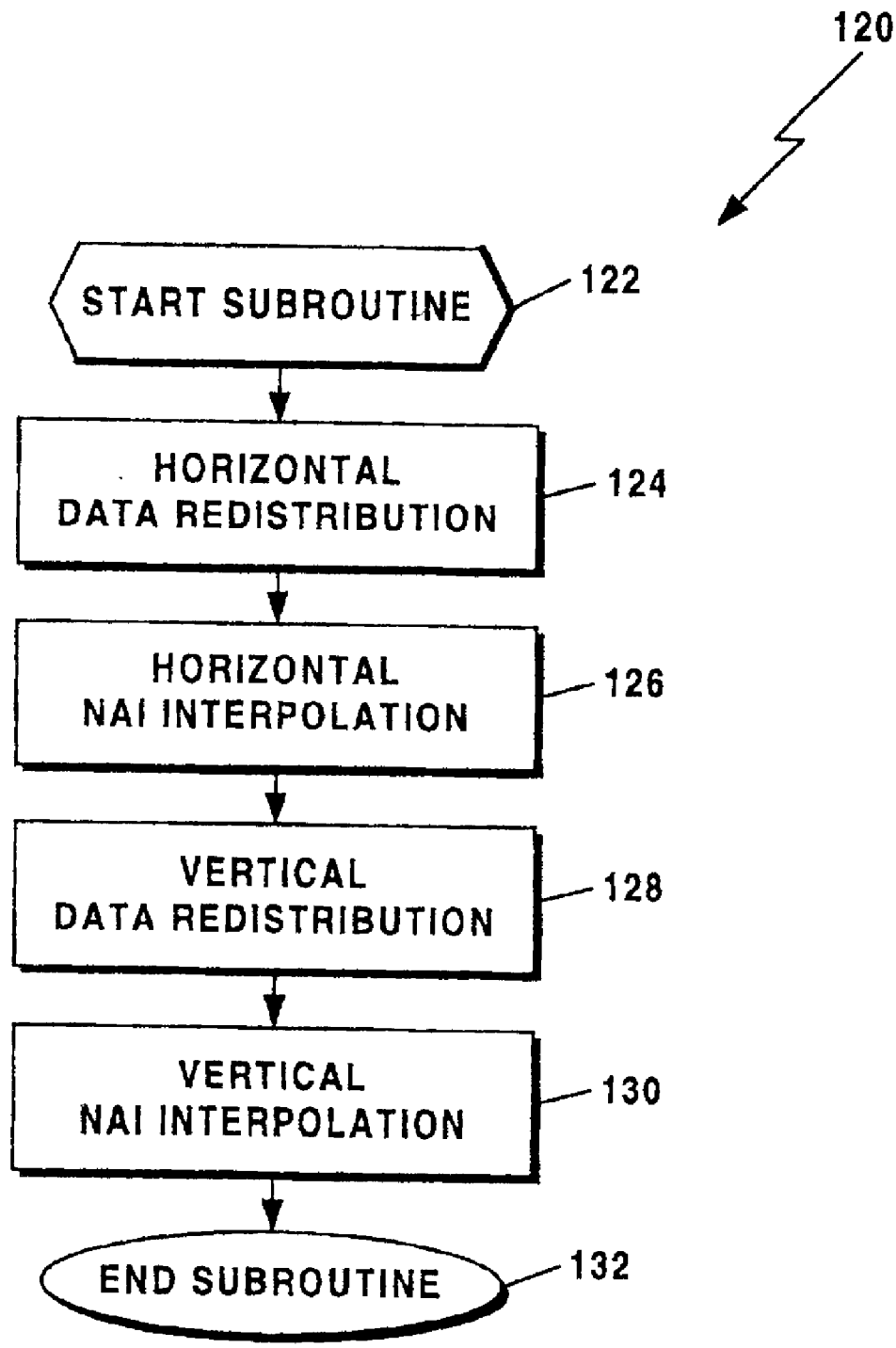
FIG. 8 is a flow chart of a resampling-up subroutine using a neighbor average interpolation (NAI) algorithm.

Referring to FIG. 8, a flow chart of the resampling-up subroutine 120 is shown using a neighbor average interpolation (NAI) algorithm. The original digitized images need to be re-sampled two-folds up to take advantage of the fine, sub-pixels-sized sensing elements of the IT CCD imager for the imaging fidelity and recovering the automally higher or finer spatial definition. In addition, the interpolation operation is needed to fill the blank rows and columns inserted to make the re-sampled image compatible to computer graphic display format. Accordingly, this subroutine 120 does two simple operations, data redistribution 124, 128 for up-scaling and data interpolation 126, 130 to fill the blank dots. These two operations are executed in sequence for horizontal dimension and vertical dimension respectively.

The NAI algorithm is compatible with the continuous tone natures of the Earth scene and hence can restore the original scene for Earth remote sensing in general and get the spatial resolution enhanced. After the NAI interpolate 93 operation, a lens geometric correction or calibration step can be added as an optional procedure for each band using a third party subroutine such as is provided in the Matrox Imaging Library Version 6.1. Then, the band-to-band pixel registration 94 which shifts different,bands in 0.5A, 0.5B steps to make all bands (originally have offsets of ~0.5A(B), ~1.5 A(B), ~2.5A(B), . . . ) superimposed precisely, of the multispectral data superimposition operation is performed to complete the high-resolution precision image restoration 95. After cropping edges, the output format of the spatial resolution enhanced image is 1520(H)×1140(V)×4(Bytes), which amounts to 7.0 Mbytes.

One additional benefit of the resampling-up operation is that the band-to-band pixel registration 94 can be done more accurately, with half pixel stepped 0.5A or 0.5B accuracy per dimension referring to the original captures. However, it should be pointed out that the resampling-up operation requires the camera to be well aligned with half-pixel offset without significant errors, so that the fold of the resampling-up is fixed as two in either horizontal or vertical dimensions. In the case of, when smaller camera alignment error needs to be considered, for example, about 0.25A or 0.25B steps in the misalignment, the folds of resampling-up may need to be increased to bigger than two. Therefore, the band-to-band pixel registration 94 can be adjusted at a level even less than a half-pixel in each dimension. This method is referred to as Precision Registration After Resampling-up (PRAR).

Figure 9:
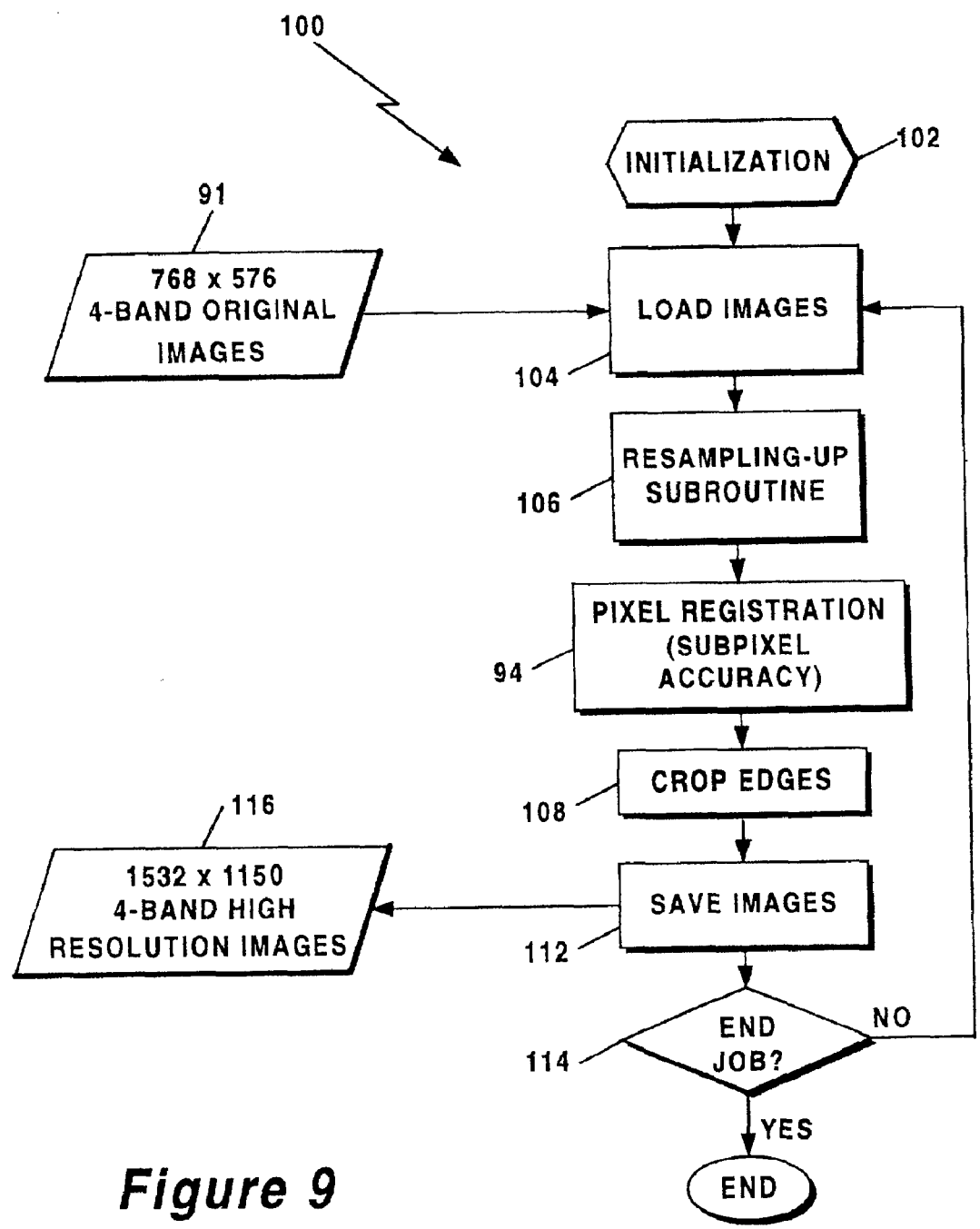
FIG. 9 is a flow chart of a high-resolution multispectral image batch processing program using pixel precision registration after resampling-up algorithm.

Referring to FIG. 9, a flow chart of a high-resolution multispectral image batch processing program 100 is shown using a pixel precision registration after resampling-up (PRAR) algorithm. The batch processing program first initializes 102 for memory allocation, image array parameter definitions, and pixel registration parameters retrieved via Windows graphic user interfaces (GUI). Next, it loads the first image file 104 into the memory, and initiates the resampling-up subroutine 106 to resample image-up using NAI algorithm (FIG. 8) for the subroutine. The pixel registration is performed followed by shift bands in the subpixel pitch shifting with increased precision using smaller quantum steps or finer pitch (½ original pixel step for two fold resampling-up) within the resampled-up image format (1536×1152×4 bands). The shifting band operation with the shift distance of 0.5A(B), 1.5A(B), . . . depending on the original camera mounting condition for band-to-band registration will make the image bigger than 1536×1152 and the edge columns and rows with band loses or color missing. Therefore, these edges need to be cropped. After cropping edges 108 the processed, spatial resolution enhanced, larger format images 112 are saved in a computer graphic file format. The program 100 checks if there are any unprocessed 768×576×4 band image files left in the computer hard disk for processing. If yes, a new file is fetched to process. The program 100 keeps processing image files in the loop until the complete batch job done.

Dynamic Range Extension

Referring again to FIG. 2, the CAMIS sensor head 11 comprises the four low noise, high performance black-and-white progressive scan CCD cameras with signal to noise ratio of 60 dB and a variable speed electronic shutter for each camera 12–15. Using such an electronic shutter, the CCD camera 12–15 can be triggered to capture a full-frame still image with precision GPS timing and its capture integration time (exposure) can be controlled from ⅟₅₀th second to ⅟₁₀,₀₀₀th second by external electronic signals. These external electronic signals are supplied by the CAMIS computer system 22 and the effective time of exposure is controlled by computer programs.

The dynamic range in a digital imaging system like CAMIS relates to both the noise present in the sensor head 11 and the accuracy of the analog to digital (A/D) converters in the computer system 22. The signal to noise ratio of each of the cameras 12–15 of 60 dB is equivalent to 10-bits. However, the CAMIS digitizer consists of four 8-bit A/D converters 172–174. Therefore, the limiting factor or physical boundary of the dynamic range of CAMIS 10 is simply the size of the quantization step of these A/D converters, which limits the system dynamic range as 8-bit (or 256 different discernable levels) per channel per snapshot.

With the electronic shutter and the integrated A/D converters, CAMIS 10 controls the exposure time appropriately to acquire a desired signal while rejecting all the rest. The choice of exposure factor is generally assisted by the real-time histogram analysis capacity of the system. For example, when imaging over a region of interest, the computer can be programmed to set up an appropriate exposure that permits no more than 1% of the pixels to have an intensity bigger than 8 bits or 255 in digital number. In addition to an exposure strategy that keeps pixel saturation to a minimum, it is also possible to set up an exposure that makes the peak of the pixel histogram sit in the middle range. This exposure strategy is best suited for imaging faint objects that dominate in a region of interest.

However, a single capture has certain limitations when trying to accommodate simultaneously very weak and very strong signals. The dynamic range of signal intensity distribution in a single image can be much larger than 256 discernable levels, for example, in an image with bright tones and shadows. It often happens that exposures that are optimized for capturing darker regions lose the bright ones, or that capturing brighter areas loses the darker ones, such as in the case of flying over a coastal region with dark water and bright sand using an 8-bit per channel snapshot. When flying over from bright beach to water, the exposure set determined by the pre-shooting histogram analysis is right for the beach but underexposes for the water, so the water is all shadow and has no detail. When flying over from water to beach, the exposure set is right for water and overexposes for beach, so the beach in completely washed out and shows no detail. A solution is to use bracketed multiple exposures to extend the dynamic range. It is desirable to retain no saturations on bright field when imaging faint sources by taking a sequence of exposures.

CAMIS 10 is enhanced with the capacity of acquiring a bracket of computer-controlled exposures, each of which freezes all the four-band spatial and spectral information simultaneously and instantaneously with a designated exposure setting. It permits the user to set two extra exposures using a Windows dialogue box control, which sets two pre-determined quantities for the increment and decrement. For example, the first exposure is set by a pre-shooting computer-assisted histogram analysis, the second and the third snapshots are set with 50% (or other) increment and 50% (or other) decrement exposures for exposure compensations or dynamic range extending. Thus, for every trigger, the CAMIS 10 will automatically bracket the image with three snapshots, one having more exposure, one having less, and one in the middle. All the three bracketed snapshots are buffered in a memory of computer system 22 at a fast rate (80 msec interval) and then transferred to a hard drive 166 of computer system 22 and saved in TIFF format. The bracketed exposure series compose an integrated data set that contains improved radiometric details for all the bright and dark fields in a scene.

Computer System

Figure 10:
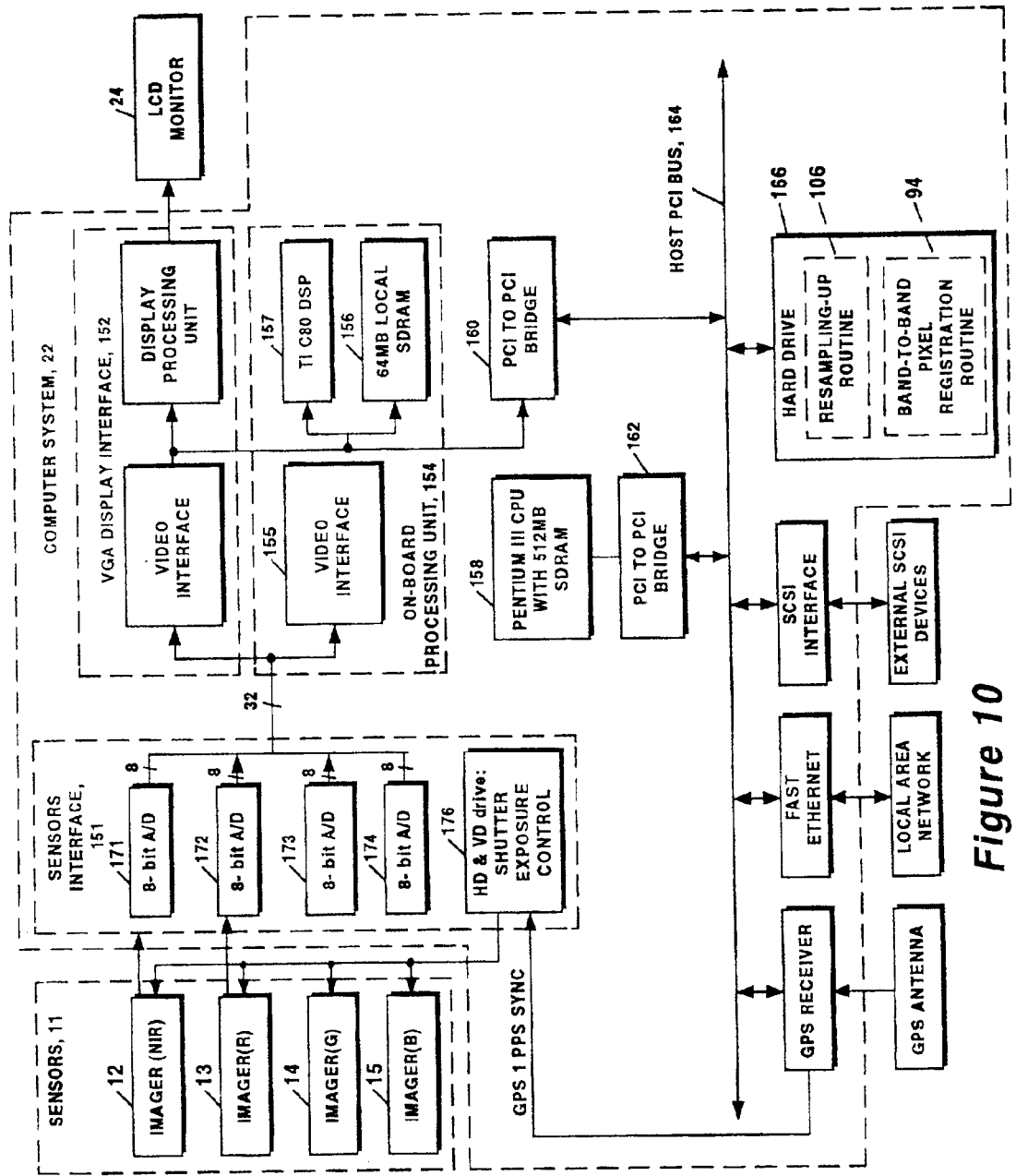
FIG. 10 is a detailed block diagram of the CAMIS computer system showing the sensor head and the data flows from the sensors to the computer system.

Referring to FIG. 10, a detailed block diagram of CAMIS computer system 22 is shown including the sensor head 11 comprising four imagers or cameras 12, 13, 14, and 15 which feed multispectral image data to the computer system 22. The computer system 22 comprises a sensor interface 151, which includes 8-bit A/D converters 171–174, for digitizing the multispectral image data from the sensor head 11. The digitized image data is fed to a VGA interface 152 for display on LCD monitor 24 and fed to an on-board processing unit 154. The multispectral bands of images are stored in local SDRAMS 156 during various processing operations. The resampling-up routine 106 and the band-to-band pixel registration routine 92 are stored in hard drive 166. These routines are processed by a Pentium III CPU 158 with 512 MB SDRAM via a Host PCI (Peripheral Component Interconnect) bus 164. Data transfers occur via the PCI bus 164, and a PCI to PCI bridge 162 interfaces the Pentium III CPU 158 to the PCI bus 164. Also, a PCI to PCI bridge 160 interfaces the video display interface 152 and the on-board processing unit 154 to the PCI bus 164.

The dedicated airborne imaging computer system 22 is designed to interface the cameras 12–15 for real-time numerical control and digital imaging. The computer system 22 may be embodied by an Intel Pentium III 800MHz CPU with 512 Mbyte SDRAM 158, a Matrox Genesis image processing card with 64 MB SDRAM on board 156, a differential capable GPS receiver 180, a 40 GByte hard drive 166, and fast Ethernet 182 and SCSI interfaces 184 and packaged into a compact computer chassis, which is sized half a standard desktop PC weighing less than 20 pounds and having a power consumption less than 150W running under Windows NT 4.0 or higher. The computer powers and synchronizes the four cameras 12–15 and digitizes the four-channel video data stream simultaneously for snapshot imaging. The cameras 12–15 are packaged as a rugged, pocket-sized remote sensor head 11, which is small enough to be fitted at any convenient location of an aerial platform. The Matrox processing card and related software with 64 MB SDRAM 156, the 8-bit A/D converters 171–174, and the video interface 155 are manufactured by Matrox Electronic Systems, Ltd. of Dorval, Quebec, Canada.

The CAMIS 10 is capable of delivering geo-referenced four-band multispectral imagery from a low-altitude, e.g. 600 feet, with a few inch resolution, to a mid-altitude, e.g. 10,000 feet, for large local area coverage. With the spatial resolution enhancement, CAMIS multispectral imagery achieves more precise band-to-band pixel registration with sub-pixel accuracy, higher spatial resolution in an output format of 1540(H)×1140(V)×32 (bits) for four bands. CAMIS 10 is enhanced with the capacity of bracketing one computed exposure with two additional up/down-stepped ones, each of which freezes all the four-band spatial and spectral information simultaneously and instantaneously. With bracketed multiple exposures, CAMIS effectively extends its dynamic range of the measurement.

This invention has been disclosed in terms of certain embodiments. It will be apparent that many modifications can be made to the disclosed apparatus and method without departing from the invention. Therefore, it is the intent of the appended claims to cover all such variations and modifications as come within the true spirit and scope of this invention.

What is claimed is:

1. An imaging system having spatial resolution enhancement comprising:

(a) a multispectral imager having four synchronized monochromatic camera for providing multispectral bands of images;

(b) said multispectral image comprising a narrow band interference filter in front of each of said four synchronized monochomatic cameras, each interference filter being different comprising a spectral band within the spectral ranges covering blue, green, red, and near infrared;

(c) a computer system connected to an output of each of said four sysnchronized cameras of said multispectral images for receiving said multispectral bands of spectral images and performing resolution enhancement;

(d) means within said computer system for resampling-up each of said multispectral bands of spectral images using neighbor average interpolation;

(e) means for storing said resampled-up multispectral bands of images for digital processing; and (f) means for performing fine pitch shifting on said multispectral band-to-band pixel registration of said resampled-up images to obtain more accurate band-to-band, registration.

2. The imaging system as recited in claim 1 wherein said computer system comprises a memory for storing said resampled-up, registered images.

3. The imaging system of claim 1 wherein each of said synchronized monochromatic cameras comprises an interline transfer, black and white, progressive scan, CCD video camera.

4. The imaging system as recited in claim 1 wherein each of said synchronized monochromatic cameras comprises 782×576 square pixels.

5. The imaging system as recited in claim 1 wherein said synchronized monochromatic cameras are optically aligned with a fractional pixel offset to each other.

6. The imaging system as recited in claim 1 wherein said computer system comprises means for acquiring a bracket of computer controlled multiple exposures of said multispectral bands of images for extending dynamic range.

* * * * *